US008282705B2

(12) United States Patent
Ekman et al.

(10) Patent No.: US 8,282,705 B2
(45) Date of Patent: Oct. 9, 2012

(54) METHOD FOR RECOVERING METALS FROM A SPENT CATALYST COMPOSITION

(75) Inventors: Kenneth Ekman, Pilspanristi (FI); Manne Carla, Pargas (FI); Mats Sundell, Hirvlax (FI); Virginie Suhonen, Harjavalta (FI); Joni Hautojärvi, Nakkila (FI)

(73) Assignees: Crisolteq Oy, Kokkola (FI); OMG Kokkla Chemicals Oy, Kokkola (FI)

( * ) Notice: Subject to any disclaimer, the term of this patent is extended or adjusted under 35 U.S.C. 154(b) by 0 days.

(21) Appl. No.: 12/663,765

(22) PCT Filed: Jun. 18, 2008

(86) PCT No.: PCT/FI2008/050371
§ 371 (c)(1),
(2), (4) Date: Apr. 9, 2010

(87) PCT Pub. No.: WO2008/155464
PCT Pub. Date: Dec. 24, 2008

(65) Prior Publication Data
US 2010/0206134 A1 Aug. 19, 2010

(30) Foreign Application Priority Data
Jun. 18, 2007 (FI) ..................................... 20075465

(51) Int. Cl.
C22B 5/00 (2006.01)
(52) U.S. Cl. .......................................... 75/722; 205/560
(58) Field of Classification Search ............... 75/722; 205/560
See application file for complete search history.

(56) References Cited

U.S. PATENT DOCUMENTS

| 4,622,119 | A | * | 11/1986 | Cerkanowicz et al. | ....... 204/561 |
| 4,871,432 | A | | 10/1989 | Pardy | |
| 6,974,842 | B1 | | 12/2005 | Spena et al. | |
| 2005/0015936 | A1 | * | 1/2005 | Eckert et al. | ................ 23/295 R |
| 2006/0111232 | A1 | | 5/2006 | Spena et al. | |
| 2006/0182808 | A1 | * | 8/2006 | Bakker et al. | ................ 424/489 |

FOREIGN PATENT DOCUMENTS

| CN | 1401427 A | 3/2003 |
| CN | 1563280 A | 1/2005 |
| EP | 0 584 964 A1 | 3/1994 |
| EP | 1 324 979 B1 * | 9/2001 |
| EP | 1472201 A | 11/2004 |
| EP | 1322591 B1 | 3/2005 |
| EP | 1165486 B1 | 6/2005 |
| EP | 1324979 B1 | 11/2006 |
| WO | WO 99/58732 A1 | 11/1999 |
| WO | WO 02/18663 A2 | 3/2002 |
| WO | WO 02/085508 | 10/2002 |
| WO | WO 03/062171 A2 | 7/2003 |
| WO | WO 2006/116126 A2 | 11/2006 |
| WO | 2007/147222 A2 | 12/2007 |

OTHER PUBLICATIONS

J.A. Whitehead et al. "Green leaching: recyclable and selective leaching of gold-bearing ore in an ionic liquid", Jun. 2004, Green Chem., 2004, 6, 313-315.*
Peter Nockemann et al, "Task-specific ionic liquids for solubilizing metal oxides", Sep. 2006, J. Phys. Chem. B 2006, 110, 20978-20992.*
International Search Report (PCT/ISA/210) for PCT/FI2008/050371 mailed Oct. 13, 2008.
Written Opinion (PCT/ISA/237) for PCT/FI2008/050371 mailed Oct. 13, 2008.
Finnish Search Report for FI 20075465 dated Mar. 6, 2008.
P. Giridhar et al., Abstract of "Recovery of Fission Palladium by Electrodeposition Using Room Temperature Ionic Liquids", Radiochimica Acta, 2006, vol. 94, Oldenbourg, Germany.
L. Zaijun et al., "Extraction Spectrophotometric Determination of Aluminum in Dialysis Concentrates with 3,5-ditertbutylsalicylfluorone and Ionic Liquid 1-butyl-3-trimethylsilylimidazolium hexafluorophosphate", Journal of Pharmaceutical and Biomedical Analysis, 2007, pp. 1609-1614, vol. 43.
S. Keskin et al., "A Review of Ionic Liquids Towards Supercritical Fluid Applications", Journal of Supercritical Fluids, 2007, pp. 150-180, vol. 43.
Supplementary European Search Report issued by the European Patent Office on Mar. 27, 2012 in corresponding European Appication No. 08775496.6-2122/2170479 (3 pages).

* cited by examiner

*Primary Examiner* — Jie Yang
(74) *Attorney, Agent, or Firm* — Buchanan Ingersoll & Rooney PC

(57) ABSTRACT

A method is provided for recovering metals from a spent catalyst composition containing an organic contaminant and catalytically active metals on a catalyst support. The metals are leached from the spent catalyst composition by adding under stirring an ionic liquid. The ionic liquid containing the leached metals is separated from the organic contaminant and the catalyst support by adding under stirring an anti-solvent. After removing the organic contaminant and the catalyst support, the leached metals are separated from the ionic liquid for example by selective precipitation, ion exchange, solvent extraction, electrodeposition, chromatographic, or pyrometallurgical methods.

13 Claims, No Drawings

METHOD FOR RECOVERING METALS FROM A SPENT CATALYST COMPOSITION

FIELD OF THE INVENTION

This invention relates to the recovery of metal values from spent catalyst compositions and in particular to the use of ionic liquids for said process. More specifically the invention concerns a selective recovery of metals from spent catalyst compositions, contaminated with organics and, in particular, recovery of cobalt and precious metals and/or compounds thereof from said spent catalyst compositions

BACKGROUND OF THE INVENTION

Metal values can be recovered from different kinds of spent metal-containing compositions, obtained as residues from various processes, such as distillation, extraction, decanting and filtration. Spent catalyst compositions, like spent Fischer-Tropsch, hydrogenation, hydrotreating or reforming catalysts, are of a special interest.

Transition metals and their coordination complexes find various industrial applications as heterogeneous or homogeneous catalysts in petrochemical, pharmaceutical and fine chemical industries. Platinum Group Metals (PGM), Au, Ag, Co and Ni are examples of metals, which are used in a variety of applications like hydrogenation, oxidation, hydroformulation, carbonylation, etc.

The economical use of metal-based catalysts is always accompanied with the efficient recovery and recycling of the valuable metals. A lot of research effort has been made to find economical routes for the recovery processes. Usually, the recovery is based on pyrometallurgical or hydrometallurgical processes.

The spent catalysts most often contain impurities due to their use, which usually induces problems in the application of traditional refining methods. For example the presence of residual organics spoils hydrometallurgical processes by hindering the leaching of metals by the reduction of the active metallic surface area available by coverage.

Alternatively, when disposed of—meaning typically that the organic is removed by burning—the presence of coke on the surface may hinder traditional leaching processes and decrease the yield. In addition, burning off the organics may imply changes in the structure of the material, like the soluble γ-alumina turning into its insoluble α-form at high temperatures. Burning can also lead to valuable losses, like in the case of rhenium forming volatile $Re_2O_7$.

A specific spent catalyst composition is the one obtained from Fischer Tropsch syntheses used in the production of paraffin hydrocarbons or liquid fuel from syngas and hydrogen. The catalyst is an impregnated catalyst comprising an alumina carrier and catalytically active metals based on cobalt and/or iron and mixtures thereof. The catalyst may also comprise noble metals as promoters. Continuous processing causes the catalyst activity to drop, mainly due to sulphur impurities in the feed, which form either cobalt sulphide or precious metal sulphides on the surface of the catalyst. Coke formation may also occur and subsequently the catalyst is deactivated.

Recycling of spent Fischer Tropsch catalysts is a great challenge for the recycling industry since the spent catalysts usually contain a high content of paraffin (50-90%), and the catalyst particles vary in size, going down to a very fine powder. In addition, both base metals and precious metals must be recovered and refined.

Attempts to remove or significantly lower the amount of paraffin in the spent catalysts are described in patent publications US 2006/0111232, U.S. Pat. No. 6,974,842 and CN 1563280, which use solvents to extract the paraffin and filtration to recover the supported catalyst, which can be used to recover the valuable metals by traditional refining methods. Patent publication WO 2002/085508 additionally describes the fluidizing and oxidizing of the recovered catalysts powder, the reduction with a reducing gas to form a reduced catalyst powder, which is then mixed with hydrocarbons to form a regenerated slurry catalyst.

In principle, there are two possible ways for reclaiming the metals from a spent catalyst composition, which still contains organic contaminants:
1) a hydrometallurgical method by which the spent catalyst is digested and the metals selectively precipitated, and a 2) pyrometallurgical method by which the spent catalyst is incinerated, the metals melted out and the catalyst support slagged off. A major obstacle of the first method is a high sensitivity to the organic contaminant, and in fact the method usually requires an incineration step to remove the contaminant before leaching. The second method is less sensitive to pollutants but incineration at high temperatures may induce difficulties in consecutive hydrometallurgical steps wherein the metals are separated from each other.

A process for recovering the used Co-containing catalyst used in Fischer-Tropsch synthesis is presented in patent publication CN 1401427, which includes reducing at 800-1200° C. and 0.1-2 MPa in $H_2/N_2$ mixed gas flow, adding diluted nitric acid, dissolving, filtering, adding a solution of sodium hydroxide to obtain precipitate of cobalt hydroxide, filtering, adding diluted nitric acid, dissolving and evaporation crystallizing to obtain $Co(NO_3)_2 \cdot 6H_2O$. Its advantages are claimed to be high Cobalt recovery rate (more than 91%), high purity (more than 94%) and low cost.

Patent application WO 02/18663 A2 provides a process for the selective recovery of aluminium, cobalt and platinum from spent Fischer-Tropsch catalysts, by initially calcinating the mixture of the spent catalyst and sodium carbonate or the spent catalyst at different temperatures in the presence of air to oxidise the organic material. Following the calcination, metal oxides such as CoO and $Co_3O_4$, $Co_2AlO_4$ and $Na_2Al_2O_4$ are formed. A solution of caustic soda is used, to selectively and efficiently dissolve aluminium oxide with substantially no dissolution of cobalt and platinum from the spent catalyst. The cobalt and platinum remain in the leached residue. The leached residue is dissolved in a solution of nitric acid to form cobalt nitrate, while the platinum remains in the acid residue, which finally is dissolved in aqua regia to form chloroplatinic acid.

It has now surprisingly been found that metals can be leached off selectively from spent catalyst compositions, without removal of the organic contaminant by incineration or other methods, by treating the spent catalyst with ionic liquids formed from ammonium compounds and a selection of hydrogen bond donors. On the other hand, imidazolium based ionic liquids can also be used as ionic liquids in the recovery process according to the invention. The ionic liquid, containing the metal value, can be separated from the organic contaminant, by separating said organic contaminant using an anti-solvent.

Ionic liquids have been extensively evaluated as environmentally friendly or "green" alternatives to conventional organic solvents for a broad range of applications. Ionic liquids have been known for over 50 years, and they were originally developed for applications as liquid electrolytes in electrochemistry. They are molten salts with melting points usually below 100° C. Ionic liquids consist of large organic cations and anions and in distinction to an ionic solution they are only composed of ions. There are a wide range of available anions and cations, which potentially give access to a broad variety of ionic liquids, which are liquid at temperatures below 100° C.

Ionic liquids show great potential as substitutes for common organic solvents, since for example miscibility, hydrophilicity and polarity can be adjusted to a reaction via an easy variation of the ion pairs. In addition, many ionic liquids have no detectable (or very low) vapour pressure and do not emit volatile organic compounds (VOC's), making them environmentally benign solvents.

The preparation of ionic liquids and their use has been described in several publications and patents. Recently, BASF introduced the Basil process—Biphasic Acid Scavenging Utilizing Ionic Liquids—as the world's first large industrial process to use ionic liquids (EP 1 472 201). With this process, acids can be removed rapidly and simply from reaction solvents. The reaction between acid and base creates a liquid salt rather than solid crystals, which in full-scale production could create problems. Reliance on ionic liquids eliminates time-consuming and expensive filtration. These liquids can easily be separated from the desired product by decanting.

Commercially available ionic liquids are mostly based on imidazoles, pyridines or ammonium compounds. Particularly interesting are the ionic liquids based on choline chloride, which is non-hazardous and used currently as chicken feed additive. Patent publications EP 1 324 979, EP 1 165 486 and EP 1 322 591 describe the preparation of ionic liquids based on choline chloride and their use. Ionic liquids of choline chloride find applications as solvents for peptide dissolution, separation and extraction of naturally occurring products, as solvents in various catalysed reactions, in recovery of platinum group metals (PGM's), zinc, copper and lead, as electrolytes for battery technology, photovoltaics and electrochromics, in electroplating metals like zinc, cobalt, copper, chromium, in electropolishing etc. In particular the dissolution of metal oxides like ruthenium oxide, copper (II) oxide, chromium (VI) oxide, vanadium pentoxide, lead (VI) oxide, manganese (IV) oxide and zinc oxide were found to be soluble in the ionic liquids prepared. The recovery of precious metals, in particular platinum and palladium, from materials in which they are present as oxides is also described. Examples of materials are for example spent automobile catalytic converters.

Ionic liquids are not "one size fits all" products. Each chemical reaction is different and therefore each process may require an ionic liquid tailored specifically to the task.

DESCRIPTION OF THE INVENTION

A new method for recovering metals from spent catalyst compositions has been developed. The recovery method according to the invention is especially suitable for spent Fischer Tropsch—catalysts. The method can also be applied to recover metal values from spent hydrogenation, hydrotreating and reforming catalysts, as well as from distillation, filtration, decanting residues or the like. The metals recovered are typically cobalt, nickel, molybdenum, rhenium or precious metals or mixtures thereof.

This novel method for recovery is based on ionic liquids. Compared to the known methods the method according to the invention is economical and environmentally friendly.

The method according to the invention for recovering metals from a spent catalyst composition comprises the steps of:

a) optionally heating the spent catalyst composition containing an organic contaminant and catalytically active metals on a catalyst support
b) leaching the metals from the spent catalyst composition by adding under stirring an ionic liquid
c) separating the ionic liquid, containing the leached metals, from the organic contaminant and the catalyst support by adding under stirring an anti-solvent
d) removing the organic contaminant and the catalyst support
e) separating the leached metals from the ionic liquid.

In this selective recovery process the metals are leached from the spent catalyst composition, advantageously without any further pre-treatment, by mixing the spent catalyst composition with an ionic liquid comprised of an ammonium compound (I) and a hydrogen bond donor (II), which is capable of forming a hydrogen bond with the ammonium compound (I). Compound (I) is preferably trimethyl glycine or choline chloride and compound (II) is a compound of formula $RCOOH$, $R_2R_3NH_2$, $RSO_3H$ or $ROH$, wherein $R$, $R_2$, $R_3$ are possibly H, C1-C16 alkyl groups, aryl groups or C7-C16 alkaryl groups optionally substituted with from 0 to 6 groups selected from $OH$, $NH_2$, $CN$, $NO_2$, $COOH$ or the like.

Preferably compound (II) is formic acid, acetic acid, or methane sulphonic acid. Additives can, if needed, be added to promote the leaching of metals by for example oxidative effects.

According to another embodiment of the invention the spent catalyst composition is mixed with an imidazolium based ionic liquid.

The spent catalyst composition is optionally heated to a required temperature in the range of 50-150° C. to melt the organic contaminant and that temperature is usually maintained during the leaching step. In case the organic contaminant of the spent catalyst composition is already in a liquid state heating may not be required.

The spent catalyst composition and the ionic liquid (together called process liquor) are mixed in a ratio between 1:0.25 and 1:10, preferably in a ratio between 1:0.25 and 1:2 at a temperature between 20-150° C. and stirred for a period of 1-10 hours to leach the metals from the spent catalyst. The ratios specified herein are mass ratios. The amount of leached metals may be analysed as a function of time to determine a suitable leaching time.

The ionic liquid is separated from the organic contaminant and the catalyst support by adding, under stirring, a cold (preferably <10° C.) anti-solvent for the organic contaminant such as water, acidified water, ethanol or the like, to separate the organic contaminant and the catalyst support, for example through precipitation. The ratio between the anti-solvent and the process liquor can vary between 1:0.5 and 1:10, preferably the ratio is between 1:1 and 1:1.5. The ratios specified herein are mass ratios.

The organic contaminant, in conjunction with the catalyst support, can be removed from the ionic liquid solution containing the leached metals for example through, filtration or decantation.

The method for recovery according to the present invention may include additional filtration, distillation and flocculation steps or the like if needed. The need for these additional steps depends on several process factors and is clear for a person skilled in the art.

The valuable metals can be separated from the ionic liquid by electrodeposition, selective precipitation, solvent extraction, ion exchange, or by chromatographic or pyrometallurgical methods, which separation methods are known to a person skilled in the art.

Alternatively, the ionic liquid, containing the leached metals, can be further processed, as such, to produce value added products, such as metal salts and catalysts, or used as such to produce, for example, plated products by electrochemical methods.

Typically, 1 part of a spent Fischer Tropsch -catalyst, containing cobalt, and rhenium on an alumina carrier and paraffin, is mixed with 0.25 to 2 parts of an ionic liquid at 80° C. for 1 hour. The parts specified herein are mass parts. The ionic liquid may for instance contain trimethyl glycine and acetic acid in the molar ratio 1:2. After 1 hour, 1-10 parts of ethanol is added to the solution under vigorous stirring during which the temperature decreases to room temperature and the paraffin precipitates to a fine powder. The ionic liquid, containing the leached metals, stays in solution and can be separated from the precipitated paraffin and the catalyst support by filtration. The leached cobalt is separated from the ionic liquid, for example, by precipitating with oxalic acid and the leached rhenium is separated by ion exchange or solvent extraction.

The invention is described with reference to the following examples, which are not intended to limit the scope of the invention.

EXAMPLES

The preparation of the ammonium based ionic liquids follows the general preparation routes described in Examples 1, 2, 5 and 7.

Example 1

Choline chloride based ionic liquids were prepared by mixing 1 mole of choline chloride and 2 moles of either acetic acid, diethylene glycol, carboxyethylisothioronium betaine, formic acid, lactic acid, methane sulphonic acid, urea or a mixture of methane sulphonic acid and stearic acid in a glass flask and heated to 100° C. for 30 minutes, during which the mixture became a clear liquid. The flask was shaken during heating to ensure thorough mixing of the components.

Example 2

Trimethyl glycine based ionic liquids were prepared as described in Example 1, but using trimethyl glycine instead of choline chloride. The ionic liquids were thus prepared by mixing 1 mole of trimethyl glycine and 2 moles of either acetic acid, diethylene glycol, formic acid, lactic acid, urea, methane sulphonic acid or carboxyethylisothioronium betaine.

Example 3

2 g of a spent Fischer Tropsch -catalyst containing 96-98% wax and 2-4% catalyst, with the approximate composition of 14 wt-% Co and 0.3% Re on alumina, was allowed to melt in a beaker under stirring and 4 g of an ionic liquid prepared in Example 1 was added and the mixture was stirred for 1 hour at 80-100° C.

The amount of leached cobalt was analysed from the ionic liquid using Atom Absorption Spectroscopy (AAS) techniques. The extraction percentages were plotted and are presented in Table 1.

TABLE 1

| Ionic liquid composition | | Cobalt recovery |
|---|---|---|
| Ammonium compound | Hydrogen bond donor | % |
| Choline chloride | Acetic acid | 51 |
| Choline chloride | Diethylene glycol | 1 |
| Choline chloride | Carboxyethylisothioronium betaine | 2 |
| Choline chloride | Formic acid | 31 |
| Choline chloride | Lactic acid | 21 |
| Choline chloride | Methane sulphonic acid (MSA) | 57 |
| Choline chloride | Methane sulphonic acid + stearic acid | 69 |
| Choline chloride | Urea | 5 |

The best recovery is achieved using a mixture of methane sulphonic acid and stearic acid as hydrogen bond donors and poor recovery is achieved using diethylene glycol. Hence, tailoring of the ionic liquid is required to achieve a good recovery of cobalt.

Example 4

2 g of a spent Fischer Tropsch -catalyst containing 96-98% wax and 2-4% catalyst, with the approximate composition of 14 wt-% Co and 0.3% Re on alumina, was allowed to melt in a beaker under stirring and 4 g of an ionic liquid prepared in Example 2 was added and the mixture was stirred for 1 hour at 80-100° C.

The amount of leached cobalt was analysed from the ionic liquid using Atom Absorption Spectroscopy (AAS) techniques. The extraction percentages were plotted and are presented in Table 2.

TABLE 2

| Ionic liquid composition | | Cobalt recovery |
|---|---|---|
| Ammonium compound | Hydrogen bond donor | % |
| Trimethyl glycine | Acetic acid | 99 |
| Trimethyl glycine | Diethylene glycol | 1 |
| Trimethyl glycine | Carboxyethylisothioronium betaine | 70 |
| Trimethyl glycine | Formic acid | 89 |
| Trimethyl glycine | Lactic acid | 71 |
| Trimethyl glycine | Methane sulphonic acid (MSA) | 59 |
| Trimethyl glycine | Urea | 4 |

In comparison to the results in Table 1, an ionic liquid based on trimethyl glycine and acetic acid gives an excellent recovery of cobalt, which is an additional indication of the importance of tailoring the used ionic liquids to achieve a good recovery of cobalt.

Example 5

The ionic liquid was prepared by mixing 1 mol of trimethyl glycine and 2 moles of acetic acid in a glass flask and heating at 100° C. for 30 minutes, during which the mixture became a clear liquid.

The flask was shaken during heating to ensure thorough mixing of the components.

2 g of a spent Fischer Tropsch -catalyst as described in Example 3 was allowed to melt in a beaker under stirring and 4 g of the ionic liquid prepared was added. The mixture was stirred for 1 hour and the extraction efficiency was followed as a function of temperature. The extraction percentages were plotted as a function of temperature and are presented in Table 3. The best result is achieved at around 80° C.

TABLE 3

| Temperature °C. | Cobalt recovery % |
|---|---|
| 60 | 78 |
| 80 | 99 |
| 100 | 90 |
| 120 | 70 |

Example 6

2 grams of a melted spent Fischer Tropsch -catalyst as described in Example 3 was mixed for 1 hour at 80-100° C. with 0.5, 1, 2 or 4 grams of ionic liquid prepared as in Example 5. The extraction percentages were plotted as a function of ionic liquid quantity and are presented in Table 4.

TABLE 4

| Ratio(* | Cobalt recovery % |
|---|---|
| 1:2 | 99 |
| 1:1 | 79 |
| 1:0.5 | 64 |
| 1:0.25 | 46 |

(*spent catalyst:ionic liquid mass ratio

The best result is achieved with a two-fold excess of ionic liquid in relation to the amount of spent catalyst treated.

Example 7

6 g of a spent Fischer Tropsch-catalyst containing 66% wax and 34% catalyst, with the approximate composition of 18 wt-% Co and 0.4% Re on alumina, was allowed to melt in a beaker under stirring and 12 g of imidazolium based ionic liquid was added and the mixture was stirred for 4-16 hours at 80-100° C. The imidazolium based ionic liquids were 1-butyl-3-methyl imidazolium-hydrogensulphate (BMIM-$HSO_4$) and 1-ethyl-3-methylimidazolium-acetate (EMIM-Acetate). Additionally 0.12 g of nitric acid was added to a selection of the mixtures as can be seen from table 5 below.

Finally, 24 grams of acidified water (pH<1) was added to the solution under vigorous stirring during which the temperature decreased and the paraffin precipitated to a fine powder. The paraffin and the catalyst support were filtered and the solutions were analysed for Co and Re using ICP-MS (Inductively coupled plasma mass spectrometry). The results are presented in table 5.

TABLE 5

| Ionic liquid | Leaching time (h) | Recovery (%) Co | Re |
|---|---|---|---|
| BMIM $HSO_4$ | 6 | 100 | 12 |
| BMIM $HSO_4$ | 6 | 100 | 11 |
| BMIM $HSO_4$ + $HNO_3$ | 6 | 100 | 88 |
| BMIM $HSO_4$ | 16 | 100 | 14 |
| BMIM $HSO_4$ | 16 | 100 | 35 |
| BMIM $HSO_4$ + $HNO_3$ | 16 | 100 | 100 |
| EMIM Acetate | 4 | 60 | 13 |
| EMIM Acetate | 6 | 76 | 15 |
| EMIM Acetate | 16 | 90 | 36 |
| EMIM Acetate + $HNO_3$ | 16 | 66 | 59 |

Example 8

The laboratory-scale procedure was scaled-up to a batch size of 210 kg to test the recovery in a larger scale and to determine the recovery of rhenium. First an ionic liquid was prepared by mixing 69 kg of the ammonium salt, trimethyl glycine, with 71 kg of acetic acid in a stirred reactor heated to 80° C. for 60 minutes, during which the mixture became a clear liquid.

Then 70 kg of a spent Fischer Tropsch-catalyst containing 96-98% wax and 2-4% catalyst, with the approximate composition of 14 wt-% Co and 0.3% Re on alumina, was added to the prepared ionic liquid and the mixture was stirred for 22 hours at 85° C.

140 kg of the mixture was pumped from the reactor into a stirred tank containing 140 kg of ethanol to precipitate the paraffin. The suspension was allowed to cool and the paraffin was filtered off from the solution. The solution was analysed to contain approximately 1470 mg/l cobalt and 30 mg/l rhenium. The theoretical concentrations were calculated to be 1420 mg/l Co and 30.5 mg/l rhenium, which show that all metals have been leached from the support.

The invention claimed is:

1. A method for recovering metals from a spent Fischer Tropsch catalyst composition comprising the steps:
   a) optionally heating the spent catalyst composition containing an organic contaminant and catalytically active metals on a catalyst support,
   b) leaching the metals from the spent catalyst composition by adding under stirring an ionic liquid, wherein the ionic liquid is an ionic compound comprising an ammonium compound and a hydrogen bond donor;
   c) separating the ionic liquid, containing the leached metals, from the organic contaminant and the catalyst support by adding under stirring an anti-solvent,
   d) removing the organic contaminant and the catalyst support, and
   e) separating the leached metals from the ionic liquid.

2. The method according to claim 1, wherein the leached metals are cobalt, nickel, molybdenum, rhenium, or precious metals, or mixtures thereof.

3. The method according to claim 2, wherein the heating temperature is in the range of 50-150° C.

4. The method according to claim 1, wherein the heating temperature is in the range of 50-150° C.

5. The method according to claim 1, wherein the ammonium compound is trimethyl glycine.

6. The method according to claim 1, wherein the ammonium compound is choline chloride.

7. The method according to claim 1, wherein the hydrogen bond donor is formic acid, acetic acid, or methane sulphonic acid.

8. The method according to claim 1, wherein the anti-solvent is ethanol, water, or acidified water.

9. The method according to claim 1, wherein the ionic liquid is separated from the organic contaminant and the catalyst support through precipitation.

10. The method according to claim 1, wherein the organic contaminant and the catalyst support are removed from the ionic liquid containing the leached metals by filtration or decantation.

11. The method according to claim 1, wherein the leached metals are separated from the ionic liquid by selective precipitation, ion exchange, solvent extraction, electrodeposition, chromatographic or pyrometallurgical methods.

12. The method according to claim 1, wherein said leaching b) comprises dispersing an organic contaminant in the ionic liquid, and wherein said separating c) comprises precipitating an organic contaminant from the ionic liquid by adding the antisolvent.

13. A method for recovering metals from a spent catalyst composition comprising the steps:
   a) optionally heating the spent catalyst composition containing an organic contaminant and catalytically active metals on a catalyst support,
   b) leaching the metals from the spent catalyst composition by adding under stirring an ionic liquid, wherein the ionic liquid is an ionic compound comprising an ammonium compound and a hydrogen bond donor, wherein the ammonium compound is trimethyl glycine, and wherein the hydrogen bond donor is formic acid, acetic acid, or methane sulphonic acid
   c) separating the ionic liquid, containing the leached metals, from the organic contaminant and the catalyst support by adding under stirring an anti-solvent,
   d) removing the organic contaminant and the catalyst support, and
   e) separating the leached metals from the ionic liquid.

* * * * *

UNITED STATES PATENT AND TRADEMARK OFFICE
CERTIFICATE OF CORRECTION

| | | |
|---|---|---|
| PATENT NO. | : 8,282,705 B2 | Page 1 of 1 |
| APPLICATION NO. | : 12/663765 | |
| DATED | : October 9, 2012 | |
| INVENTOR(S) | : Kenneth Ekman et al. | |

It is certified that error appears in the above-identified patent and that said Letters Patent is hereby corrected as shown below:

On the Title page, first column, Inventors should read:

(75) INVENTORS:
Kenneth Ekman, Piispanristi (FI);
Manne Carla, Pargas (FI);
Mats Sundell, Hirvlax (FI);
Virginie Suhonen, Harjavalta (FI);
Joni Hautojärvi, Nakkila (FI)

Signed and Sealed this
Ninth Day of April, 2013

Teresa Stanek Rea
*Acting Director of the United States Patent and Trademark Office*